US008644183B2

(12) United States Patent
Jiang et al.

(10) Patent No.: US 8,644,183 B2
(45) Date of Patent: Feb. 4, 2014

(54) SYSTEMS AND METHODS FOR MEMORY-EFFICIENT STORAGE AND EXTRACTION OF MAXIMUM POWER REDUCTION (MPR) VALUES IN TWO-CARRIER WIRELESS DATA SYSTEMS

(75) Inventors: Jinhua Jiang, Palo Alto, CA (US); Zae Yong Choi, San Diego, CA (US); Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 13/533,585

(22) Filed: Jun. 26, 2012

(65) Prior Publication Data
US 2013/0343249 A1 Dec. 26, 2013

(51) Int. Cl.
*H04J 1/16* (2006.01)
(52) U.S. Cl.
USPC .......................................... 370/252; 370/328
(58) Field of Classification Search
None
See application file for complete search history.

(56) References Cited

U.S. PATENT DOCUMENTS

| | | | |
|---|---|---|---|
| 7,460,553 B2 * | 12/2008 | Riveiro Insua et al. | 370/437 |
| 7,706,804 B2 * | 4/2010 | Huh et al. | 455/450 |
| 2007/0121547 A1 * | 5/2007 | Huh et al. | 370/329 |
| 2010/0150126 A1 | 6/2010 | Scholand et al. | |
| 2010/0239031 A1 | 9/2010 | Wallen | |
| 2011/0199949 A1 | 8/2011 | Lee et al. | |
| 2013/0012255 A1 * | 1/2013 | Kim et al. | 455/522 |
| 2013/0051297 A1 * | 2/2013 | Kim et al. | 370/311 |
| 2013/0142098 A1 * | 6/2013 | Kwon et al. | 370/311 |
| 2013/0148619 A1 * | 6/2013 | Ahn et al. | 370/329 |
| 2013/0178221 A1 * | 7/2013 | Jung et al. | 455/450 |
| 2013/0182661 A1 * | 7/2013 | Piipponen et al. | 370/329 |
| 2013/0215866 A1 * | 8/2013 | Ahn et al. | 370/329 |
| 2013/0225228 A1 * | 8/2013 | Park et al. | 455/522 |

FOREIGN PATENT DOCUMENTS

| | | |
|---|---|---|
| WO | 2011070460 A1 | 6/2011 |
| WO | 2012014160 A1 | 2/2012 |

OTHER PUBLICATIONS

Ericsson et al., "Initial cubic metric analysis for uplink MIMO for HSUPA", 3GPP Draft; R1-110495 Initial Cubic Metric Analysis for Upink MIMO in HSUPA, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; Jan. 17, 2011, Jan. 11, 2011, XP050490302, [retrieved on Jan. 11, 2011] the whole document.

(Continued)

*Primary Examiner* — Andrew Lee
(74) *Attorney, Agent, or Firm* — Charles Chesney

(57) ABSTRACT

Systems and methods for memory-efficient storage and extraction of maximum power reduction (MPR) values in two-carrier wireless data systems are presented. A wireless broadband device can operate under the HSUPA Category 9 standard, in which two carriers can be employed for data uplinks. Due to power saturation, interference, and other factors, transmission output power is limited to various levels depending on channel configuration. Under previous standards using one carrier, the maximum power reduction (MPR) needed to address those issues could be stored on the device, since the total number of MPR values was limited. With the introduction of dual carriers in HSUPA-9, storing all possible MPR values is no longer feasible. Platforms and techniques are disclosed which allow accurate generation of MPR values in a two-carrier system, utilizing the 2nd, 4th, and 6th moments of the complex signals to derive MPR values without attempting to store all possible carrier combinations.

22 Claims, 8 Drawing Sheets

(56) References Cited

OTHER PUBLICATIONS

Huawei et al., "Introduction of OLTD into 25.101", 3GPP Draft; R4-123586 Revision of R4-122481 V5, 3rd Generation Partnership Project (3GPP), Mobile Competence Centre; 650, Route Des Lucioles ; F-06921 Sophia-Antipolis Cedex ; France, vol. RAN WG4, no. Prague, Czech Republic; May 21, 2012-May 25, 2012, May 26, 2012, XP050614805, [retrieved on May 26, 2012] section 6.2.2.
International Search Report and Written Opinion—PCT/US2013/047845—ISA/EPO—Aug. 27, 2013.
Qualcomm Europe: "Comments on E-TFC Restriction and Maximum Power Reduction", 3GPP Draft; R4-050725, 3rd Generation Partnership Project (3GPP), Mobile Competence Centre ; 650, Route Des Lucioles ; F-06921 Sophia-Antipolis Cedex; France, vol. RAN WG4, no. London, UK; Sep. 3, 2005, XP050174300, [retrieved on Sep. 3, 2005] p. 2.
Qualcomm Incorporated: "Cubic metric analysis for DC-HSUPA 16 QAM", 3GPP Draft; R4-123312 DC HSUPA 16 QAM CM REV1, 3rd Generation Partnership Project (3GPP), Mobile Competence Centre; 650, Route Des Lucioles; F-06921 Sophia-Anti Polis Cedex; France, no. Prague, Czech Republic; May 21, 2012-May 25, 2012, May 14, 2012, XP050614555, [retrieved on May 14, 2012] title; section 1; section 2.

\* cited by examiner

SYSTEMS AND METHODS FOR MEMORY-EFFICIENT STORAGE AND EXTRACTION OF MAXIMUM POWER REDUCTION (MPR) VALUES IN TWO-CARRIER WIRELESS DATA SYSTEMS

FIELD

The present teachings relate to systems and methods for memory-efficient storage and extraction of maximum power reduction (MPR) values in two-carrier wireless data systems, and more particularly, to platforms and techniques for storing and accessing the full range of permissible power reduction levels in two-carrier wireless data systems on the mobile device in a compact memory footprint.

BACKGROUND

In wireless data systems such as cellular broadband smart phones and other devices, the desire for maximum connection speeds is balanced by transmission constraints such as a desire to avoid adjacent channel interference, a desire to avoid transmission modem saturation that can occur above certain power levels, and other transmission conditions or criteria. Under wireless industry standards used to guide power transmission levels, different maximum power reduction (MPR) levels are specified for different channel conditions or configurations. The High Speed Uplink Packet Access (HSUPA) Category 7, 3GPP Release 7 standard, for instance, specifies or requires that packet uplink systems using a single carrier provide a finite number of possible MPR values, depending on channel configuration or operating conditions. The total number of possible power reduction levels can be stored in less than one megabyte of memory using indexing, compression, and other techniques. This represents a manageable amount of memory that can be implemented today on many smart phones or other devices. Data rates of 11.5 Mbits/sec are possible in HSUPA-7 systems.

However, the wireless industry standards which regulate wireless data technology continue to evolve. In the forthcoming High Speed Packet Access (HSUPA) Category 9, 3GPP Release standard, for example, wireless broadband devices will evolve to include modems or other transmission hardware which utilize not one, but two carriers, in part to create the possibility of increased uplink data rates. Data rates of up to 23.0 Mbits/sec are in fact possible under HSUPA-9 devices, permitting broadband users and content providers to enjoy enhanced data delivery. However, with the incorporation of not one but two carriers in HSUPA-9 systems, the determination of the MPR values over various channel configurations and conditions becomes considerably more complicated.

In actuality, since two carriers are used, each having independent and potentially continuously variable power levels, the number of possible MPR values becomes unlimited. Possible approaches for the reduction of that unbounded number of MPR values can be considered, including, for instance, the quantization of permissible reduction values on each carrier over selected incremental ranges. However, even using a quantization type of approach, the number of possible combinations of carrier power levels across the two carriers remains unmanageably large. Reducing or limiting the number of permissible carrier power levels to twenty-one, for instance, still results in a total number of combined carrier power levels on the order of a billion combinations. The storage of that number of discrete MPR levels would be impossible or impractical on today's smart phones or other wireless data devices.

It may be desirable to provide methods and systems for memory-efficient storage and extraction of maximum power reduction (MPR) values in two-carrier wireless data systems, in which the entire range of MPR power reduction levels can be encoded and stored in a relatively compact memory footprint on a mobile data device, allowing valid MPR values to be extracted or generated in real-time operating conditions for HSUPA-9 or other two-carrier platforms.

DESCRIPTION OF DRAWINGS

The accompanying drawings, which are incorporated in and constitute a part of this specification, illustrate implementations of the present teachings and together with the description, serve to explain the principles of the present teachings. In the figures.

DESCRIPTION OF IMPLEMENTATIONS

Implementations of the present teachings relate to systems and methods for memory-efficient storage and extraction of maximum power reduction (MPR) values in two-carrier wireless data systems. More particularly, implementations relate to platforms and techniques for encoding, storing, and extracting and/or generating a complete range of valid values for maximum power reduction (MPR) with comparatively compact memory storage that can be applied to HSUPA-9 and/or other dual-carrier wireless data systems.

Reference will now be made in detail to exemplary implementations of the present teachings, which are illustrated in the accompanying drawings. Where possible the same reference numbers will be used throughout the drawings to refer to the same or like parts.

Figure 1:
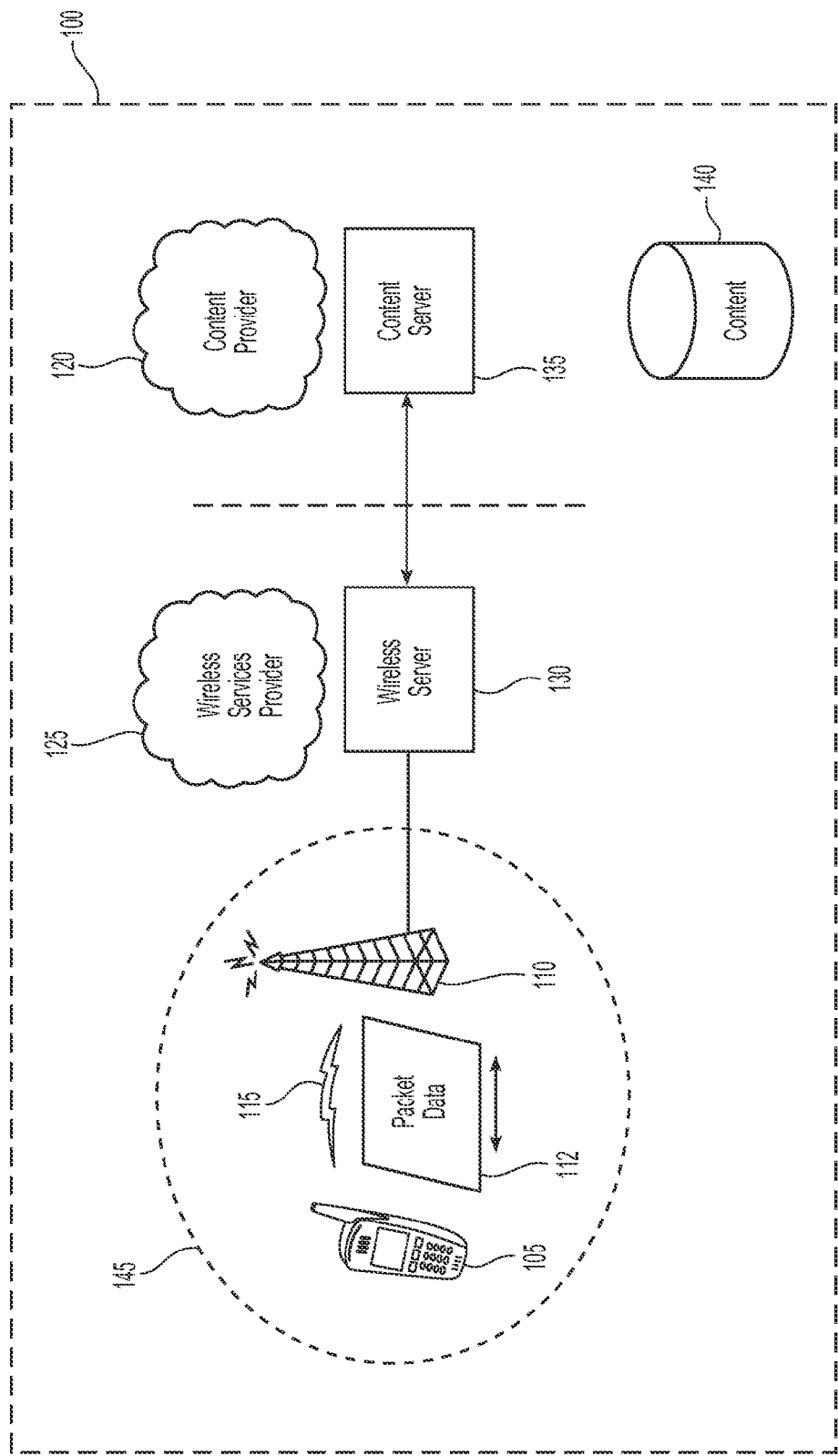
FIG. 1 illustrates an overall network in which systems and methods for memory-efficient storage and extraction of maximum power reduction (MPR) values in two-carrier wireless data systems can be implemented, according to various aspects.

FIG. 1 illustrates a block diagram of an exemplary wireless network 100 consistent with various implementations of the present teachings. As shown in FIG. 1, wireless network 100 can include a wireless services provider 125 and a content provider 120. Content provider 120 may be an Internet service provider (ISP) or other provider of digital content. Content provider 120 may operate a content server 135 for providing access to digital content 140 stored in computer readable media. Wireless services provider 125 may be linked to content provider 120 through any appropriate communications link 324, such as a WAP gateway, a socket connection, etc. In an implementation, wireless services provider 125 may retrieve digital content 140 from content server 135 over a communications link and provide digital content 140 to mobile devices 105 over wireless interface 115. However, it is to be understood that the present disclosure is not limited to such an arrangement, and that mobile device 105 may obtain digital content 140 by other mechanisms.

Wireless services provider 125 can provide cellular telephony, wireless data, and/or other digital communications services to users of mobile electronic devices, such as a mobile device 105. In implementations, mobile device 105 can be a cellular phone, a smartphone, a laptop, a PDA, a mobile messaging device, etc. Wireless services provider 125 may be a cellular telephone service provider, a personal communications services (PCS) provider, an Internet access provider, or a provider of other wireless data services. Wireless services provider 125 may operate a wireless server 130 and a set of base stations 110. As shown in FIG. 1, mobile device 105 may communicate with wireless server 130 using a client-server software architecture over a wireless interface 115 through set of base stations 110. Mobile device 105, wireless interface 115, and set of base stations 110 can together comprise a wireless communication network 145, including data uplink and downlink capability, consistent with various implementations described herein. In aspects, mobile device 105 can be configured to communicate packet data 112 between the mobile device 105 and the set of base stations, wireless server 130, and/or other access points, services, and/or entities. In aspects, the signaling or modulation scheme used to transmit the packet data 112 can be or include a dual-carrier wireless broadband transmission scheme, such as dual-carrier high-speed uplink packet access (DC-HSUPA) systems, whose power operations specifically including maximum power reduction factors, can be managed according to platforms and techniques described herein.

Figure 2:
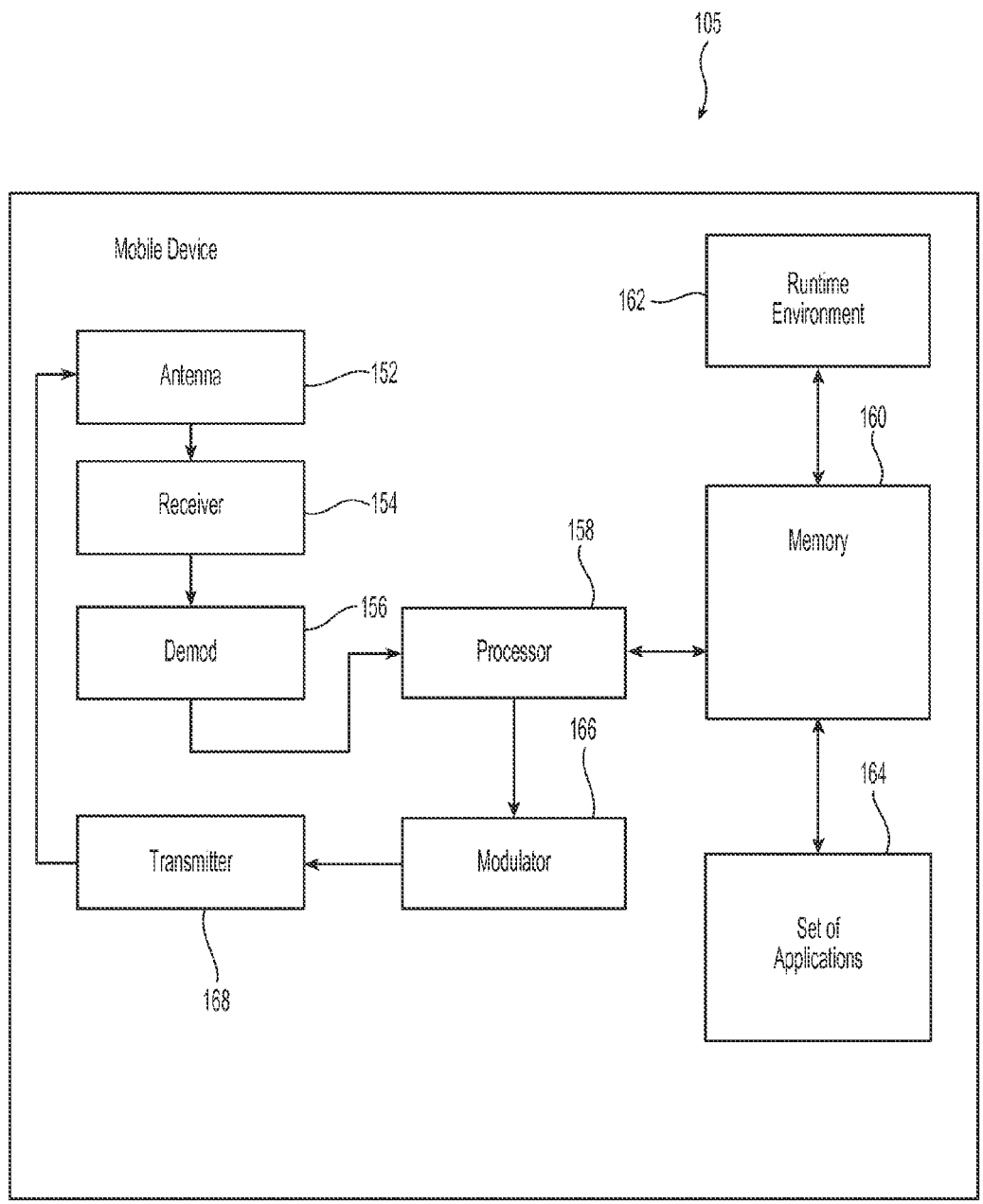
FIG. 2 illustrates various hardware, software, and other resources that can be incorporated in an exemplary mobile device in which systems and methods for memory-efficient storage and extraction of maximum power reduction (MPR) values in two-carrier wireless data systems can be implemented, according to various aspects.

FIG. 2 illustrates an exemplary hardware configuration of the mobile device 105, consistent with various implementations. Mobile device 105 can include at least one antenna 152 (e.g., a transmission receiver or group of such receivers comprising an input interface) that receives a signal (e.g., pertaining to a mobile call initiation or other handshake, a handshake response, a mobile application data transfer, a data event, data event response, handshake termination, and so on) and a receiver 154, which performs actions (e.g., filters, amplifies, down-converts, etc.) on the received signal. Antenna 152 can for example transmit or receive a response to a handshake request, data event request, or the like. Antenna 152 and receiver 154 can also be coupled with a demodulator 156 that can demodulate received signals and provide them to a processor 158 for processing. Mobile device 105 can additionally include memory 160 that is operatively coupled to processor 158 and that can store data to be transmitted, received, and the like.

Processor 158 can analyze information received by antenna 152 and/or a user input interface of mobile device 105 (not depicted), and/or generate information for transmission by a transmitter 168 via a modulator 166. Modulator 166 can be or include processor, transmission, and/or other logic, applications, hardware, and/or software to manage transmission activity on the mobile device 105, including power management features according to the present teachings. In addition or instead, in implementations, the processor 158 can control and/or reference one or more resources or components (e.g., 156, 162, 164, 166, 168) of mobile device 105. Additionally, processor 158 can execute a runtime environment 162, such as the BREW™ platform available from Qualcomm Inc., Sand Diego, Calif., as well as one or more set of applications 164 or other software, modules, applications, logic, code, or the like. Although processor 158 and modulator 166 are illustrated as separate processors, it should be understood that the functions of these entities can be combined in a single processor or split apart into different processors in various embodiments. Transmitter 168 may be, for example, a standard transmitter such as commonly used in mobile devices for transmitting information to an access point (e.g., a base station).

Figure 3:
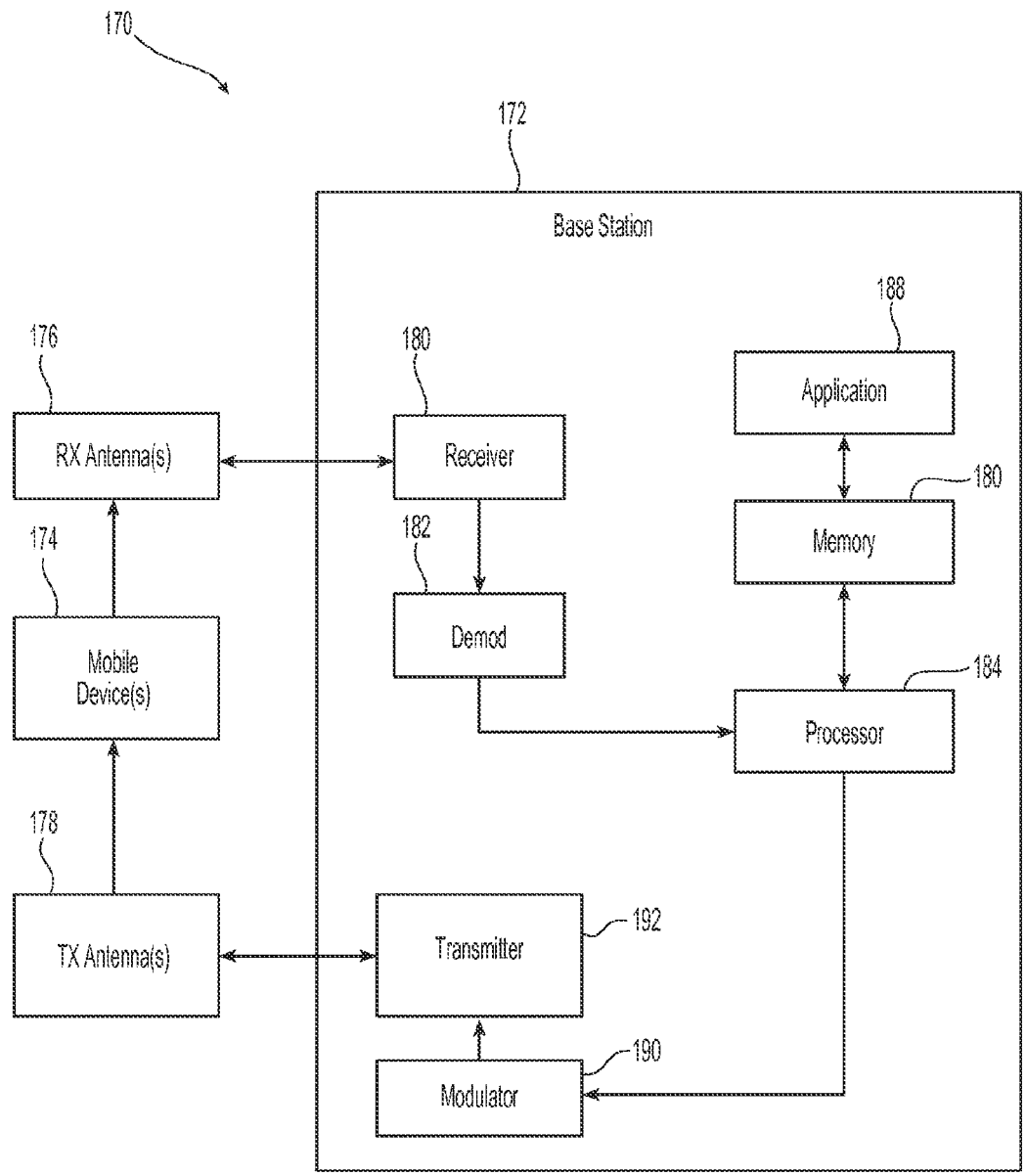
FIG. 3 illustrates various hardware, software, and other resources that can be incorporated in an exemplary base station with which systems and methods for memory-efficient storage and extraction of maximum power reduction (MPR) values in two-carrier wireless data systems can operate, a, according to various implementations.

FIG. 3 illustrates an exemplary hardware configuration of a system 170 including a base station 172 that can serve as a network access point to the mobile device 105, according to various implementations. System 170 can comprise base station 172 (e.g., access point, cell tower, etc.) with a receiver 180 that receives signal(s) from one or more mobile devices 174 through a plurality of receive antennas 176, and a transmitter 192 that transmits to the one or more mobile devices 174 through a transmit antenna 178. Receiver 180 can receive information from receive antennas 176 and be operatively associated with a demodulator 182 that demodulates received information. Base station 172 may be, for example, a base station such as base station 110 of FIG. 1

A processor 184 in the base station 172 can analyze demodulated signals provided by demodulator 182. The processor 184 further couples to a modulator 190 and a memory 186 that can store one or more application 188 that can execute, support, facilitate and/or participate in communication activities with the mobile device 105, as described herein.

Figure 4:
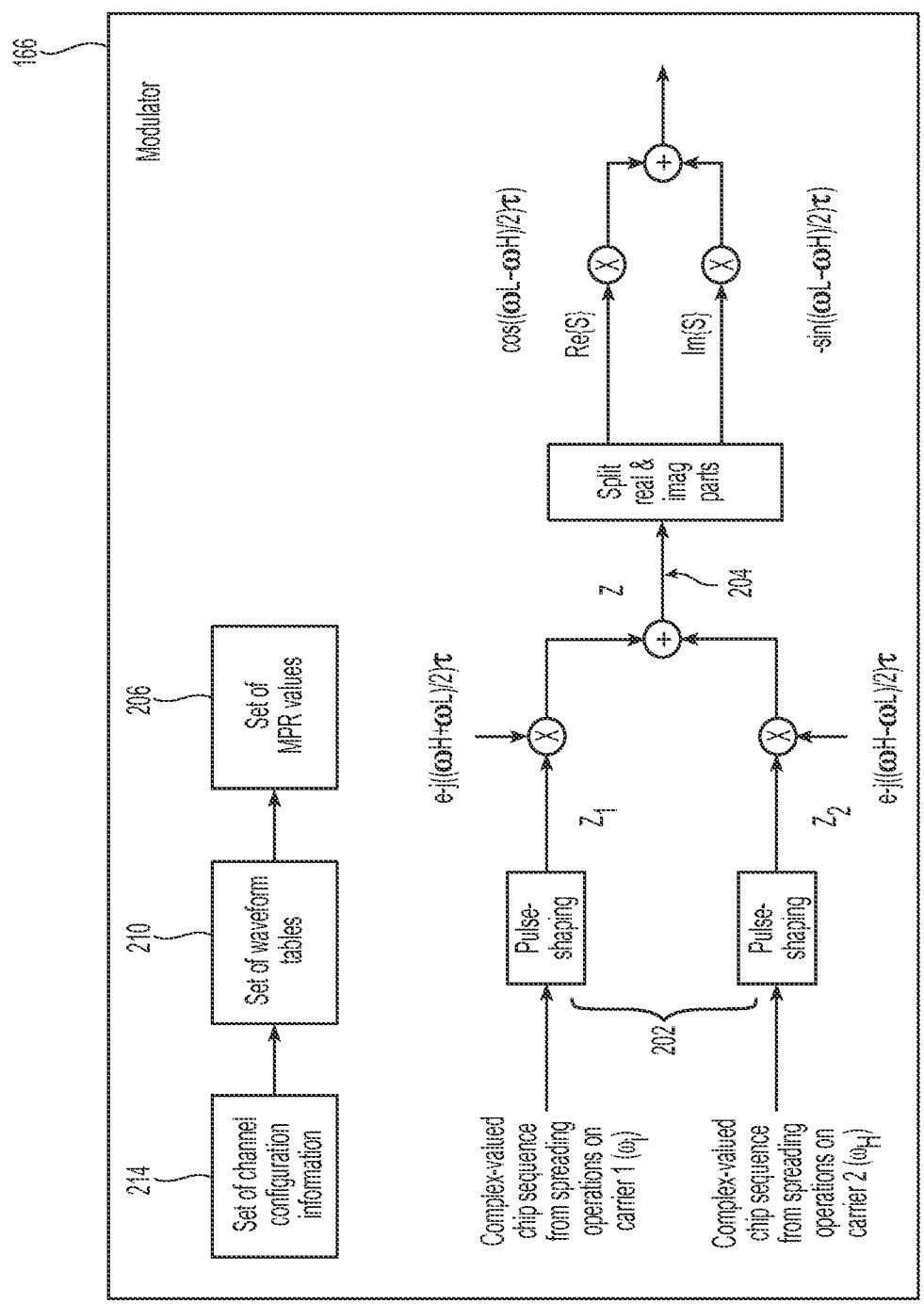
FIG. 4 illustrates various operational details of a modulator that can be incorporated in a mobile device, according to various implementations.

According to aspects, the maximum power reduction (MPR) levels, factors, ratios, and/or other parameters needed to operate the mobile device 105 in wireless data operations can be regulated and managed by logic and data contained in the mobile device 105. More specifically and as for instance illustrated in FIG. 4, in aspects, the modulator 166 of the mobile device 105 can operate on a set of dual-carrier waveforms 202, which can, as shown, be combined into an aggregate or composite complex signal Z 204 comprising the combination of the two complex-valued waveforms $Z_1$ and $Z_2$ of the set of dual-carrier waveforms 202. According to aspects of the present teachings, with the carriers $Z_1$ and $Z_2$ available for transmission power reduction, instead of storing the MPR values for all possible dual-carrier high-speed uplink packet access (DC-HSUPA) waveforms associated with the composite complex signal Z 204, which would require a substantial amount of memory, implementations herein only store certain statistical or other properties of each of the set of dual-carrier waveforms 202, and compute the MPR value based on those statistical or other properties in the mobile device 105.

According to aspects, specifically, the 2nd, 4th, and 6th moments of norm of the component waveform on each carrier, $Z_1$ and $Z_2$, can be stored in the mobile device 105, for instance in a set of waveform tables 210. As used herein, the term "moment" refers to a quantitative measure of a set of points. For example, the nth moment of a real valued continuous function, f(x), about a value c may be represented by the following formula:

$$\mu'_n = \int_{-\infty}^{\infty} (x-c)^n f(x)\,dx$$

The $2^{nd}$ moment is often referred to as the variance of the waveform, where its positive square root is the standard deviation.

A set of MPR values 206 is in an aspect be generated by retrieving the moments from the set of waveform tables 210, and determining the corresponding MPR values using analysis and calculations noted herein. The reduction of necessary memory on the mobile device 105 may be calculated, for example, by denoting the number of waveforms of $Z_1$ as $N_1$, and the number of waveforms of $Z_2$ as $N_2$. The number of table entries required to be stored is reduced from $N_1*N_2$ to $3*N_1+3*N_2$, since only the 2nd, 4th, and 6th moments are stored (along with the 1st moment or original complex signal). In implementations, it may be noted that further reductions in memory can be achieved by recognizing that the waveforms on the second carrier ($Z_2$) are or can be configured as a sub-set of those on the primary carrier ($Z_1$).

Hence, given a configuration of the dual-carrier high-speed uplink packet access (DC-HSUPA) waveform, an associated configuration for each individual-carrier can be obtained, accessed, and/or retrieved from a corresponding set of table entries, $E\{|Z_1|^2\}$, $E\{|Z_1|^4\}$, $E\{|Z_1|^6\}$, and $E\{|Z_2|^2\}$, $E\{|Z_2|^4\}$, $E\{|Z_2|^6\}$, accessed on or via the device 105. In this representation, $E(|Z_1|^2)$ refers to the entry (E) of the second moment (^2) of the norm of the primary carrier ($Z_1$).

In terms of arriving at the MPR value to be used for a given set of dual-carrier waveforms 202, 3GPP specifications including Technical Specification (TS) 25.101 Section 6.2.2 for signal carrier HSUPA, and Section 6.2.2A for dual-carrier high-speed uplink packet access (DC-HSUPA), define the derivation of MPR values for HSUPA. In the dual-carrier high-speed uplink packet access (DC-HSUPA) case, for example, the MPR is defined to be MAX(CM-0.72,0), where the CM is referred to as the cubic metric (CM). The CM is computed as follows:

$$\text{CM}=\text{CEIL}\{[20*\log 10((v\_norm\hat{\ }3)rms)-20*\log 10((v\_norm\_ref\hat{\ }3)rms)]/k,0.22\}, \quad \text{Equation 1}$$

where:

v_norm is the normalized voltage waveform of the input signal;

$V_{cub}$=(V_norm^3)rms;

20 log 10($V_{cub}$_ref)=1.52 dB; and

K=1.66 for dual-carrier high-speed uplink packet access (DC-HSUPA).

To generate the MPR, in this example $V_{cub}$ is obtained It is difficult or impossible to obtain a closed-form expression for the MRP, given the set of parameters which defines a waveform. Instead, the inventors herein have performed simulations and other analyses to obtain the $V_{cub}$ as a function of waveform parameters. With $V_{cub}$ in hand, the cubic metric (CM) and MPR for the particular waveform can be calculated.

An estimate for $V_{cub}$ as an intermediate value for the MPR computation can be generated according to the following:

$$V_{cub}(Z) = \sqrt{\frac{E\{|Z|^6\}}{E^3\{|Z|^2\}}} \approx \sqrt{\frac{E\{|Z_1|^6\}+E\{|Z_2|^6\}+9E\{|Z_1|^4\}E\{|Z_2|^2\}+9E\{|Z_1|^2\}E\{|Z_2|^4\}}{(E\{|Z_1|^2\}+E\{|Z_2|^2\})^3}} \quad \text{Equation 2}$$

Then, the MPR value that can be used to reduce the transmission power of the mobile device 105 can be calculated according to specifications contained in the 3GPP standards, including those noted, as understood by persons skilled in the art:

$$\text{CM}=\text{CEIL}\{[20*\log 10V_{cub}(Z)-1.52/k,0.22\}(\text{dB}), \quad \text{Equation 3}$$

$$\text{MPR}=\text{MAX}(\text{CM}-0.72,0)(\text{dB}). \quad \text{Equation 4}$$

Another advantage of platforms and techniques according to the present teachings is that they can deal with any arbitrary power difference between the two carriers. As used herein, the term arbitrary power difference refers to a difference in power levels that is not known a priori (i.e., during manufacture of the mobile device). In those regards, the dual-carrier high-speed uplink packet access (DC-HSUPA) waveform (that is, the composite complex waveform Z 204) can be represented as:

$$Z = Z_1 e^{-j\left(\frac{w_H-w_L}{2}\right)t} + \alpha Z_2 e^{+j\left(\frac{w_H-w_L}{2}\right)t} \quad \text{Equation 5}$$

where α is a scalar determining the power difference between the carriers. Correspondingly, it can be calculated that:

$$V_{cub}(Z) = \sqrt{\frac{E\{|Z|^6\}}{E^3\{|Z|^2\}}} \approx \sqrt{\frac{E\{|Z_1|^6\}+\alpha^6 E\{|Z_2|^6\}+9\alpha^2 E\{|Z_1|^4\}E\{|Z_2|^2\}+9\alpha^4 E\{|Z_1|^2\}E\{|Z_2|^4\}}{(E\{|Z_1|^2\}+\alpha^2 E\{|Z_2|^2\})^3}} \quad \text{Equation 6}$$

The above-discussed approach may potentially increase the accuracy of the final set of estimated MPR values compared to an extended conventional algorithm for dual-carrier high-speed uplink packet access (DC-HSUPA) applications, which would again require quantizing the power difference. As noted, a feature used in systems and methods for memory-efficient storage and extraction of maximum power reduction (MPR) values in two-carrier wireless data systems herein is that the relation between the MPR value for the dual-carrier high-speed uplink packet access (DC-HSUPA) waveform and statistical or other properties of the waveform on each component carrier are discovered and utilized, reducing the total number of data points that must be stored on the mobile device 105. The retrieval of the set of MPR values 206 according to the present teachings is therefore a hybrid of storage-based and computation-based values. However, the storage requirements are satisfactorily within the range of electronic memory that can be built into the mobile device 105 or other wireless broadband devices, while also being within the range of computational abilities of the processor and other components of the mobile device 105 or other devices. In terms of required memory, the requirement according to implementations of the present teachings is reduced or compressed at least from order $N_1*N_2$ to order $3*N_1+3*N_2$. Considering the scale of $N_1$ and $N_2$ (which can be approximately 200,000, or more or less), the reduction can be significant.

Figure 5:
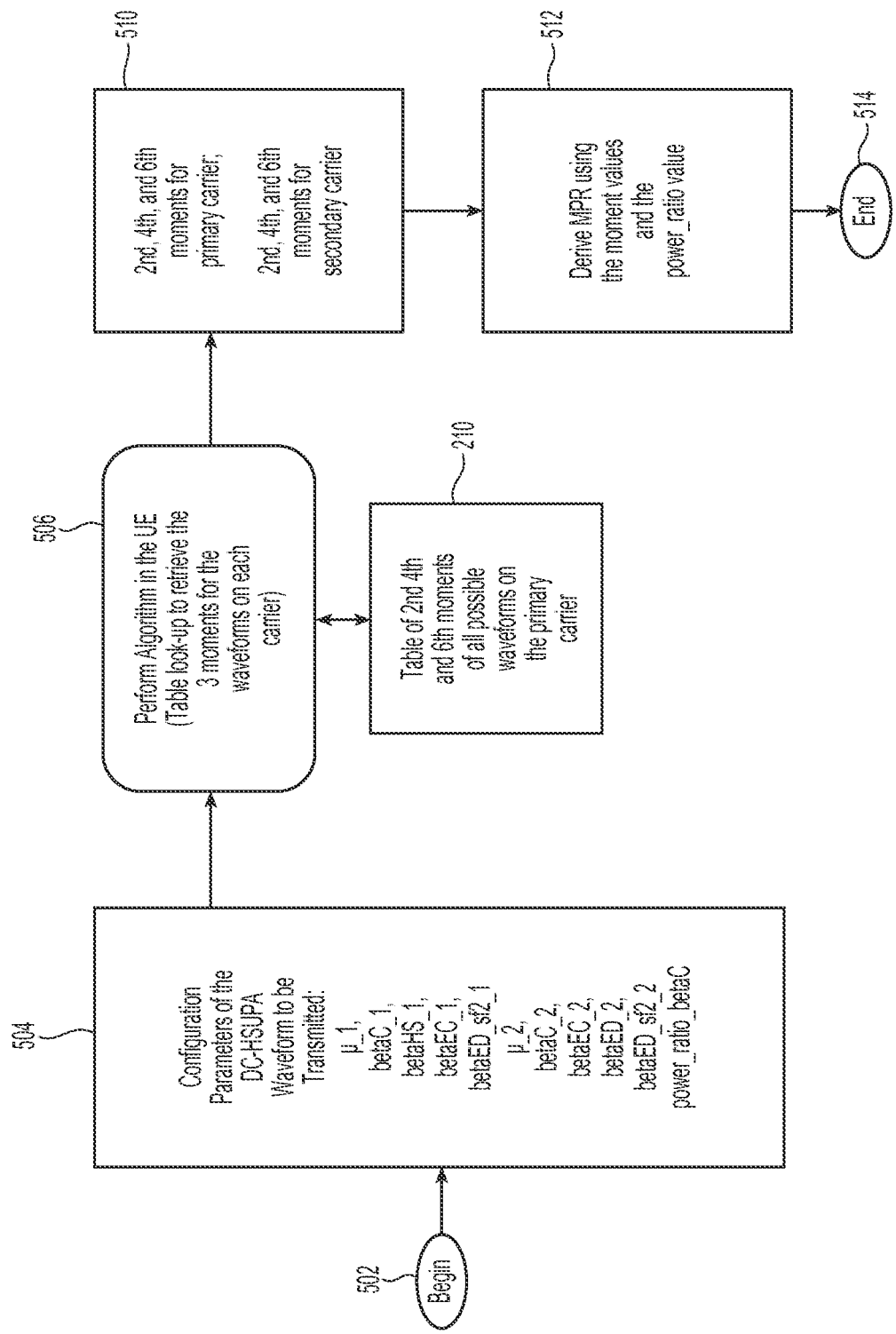
FIG. 5 illustrates a flowchart of processing related to generating and accessing tables used to store waveform moments and other information, according to various implementations.

FIG. 5 illustrates a flowchart of waveform and other processing that can be performed in systems and methods for memory-efficient storage and extraction of maximum power reduction (MPR) values in two-carrier wireless data systems, according to aspects. In 502, processing can begin. In 504, the set of channel configuration information 214 of the dual-carrier high speed uplink packet access (DC-HSUPA) waveform to be transmitted via the modulator 166 of the mobile device 105 is accessed, identified, received, and/or retrieved by modulator 166. In aspects as shown, the set of channel configuration information 214 can include, for example, wireless channel and/or configuration data such as the power_ratio value (identified as power_ratio_betaC in FIG. 5) indicating the ratio between the two complex carriers of the DC-HSUPA waveform, $\mu\_1$, betaC_1, betaHS_1, and/or others, as understood by persons skilled in the art. In 506, the modulator 166 and/or other processor, device, service, and/or application performs an algorithm to generate, for instance, the values described in Equations 1-6 noted herein and other processing using the channel configuration information 214. In 510, the modulator 166 identifies (e.g., recovers) the 2nd, 4th, and 6th moments for in the individual carrier of the dual-carrier waveforms 202 based on the entries looked up in 506. In 512, the modulator 166 and/or other processor, device, service, and/or application derives the set of MPR values 206 using the obtained 2nd, 4th, and 6th moments of the set of dual-carrier waveforms 202, along with the power_ratio value indicating the ratio between the two complex carriers, and/or other data. In 514, processing can repeat, return to a prior processing point, jump to a further processing point, or end. Although FIG. 5 was discussed with reference to modulator 166 performing many of the discussed steps for ease of explanation, it should be understood that in other embodiments one or more or all of these steps may be performed by other processors, such as processor 158.

Figure 6:
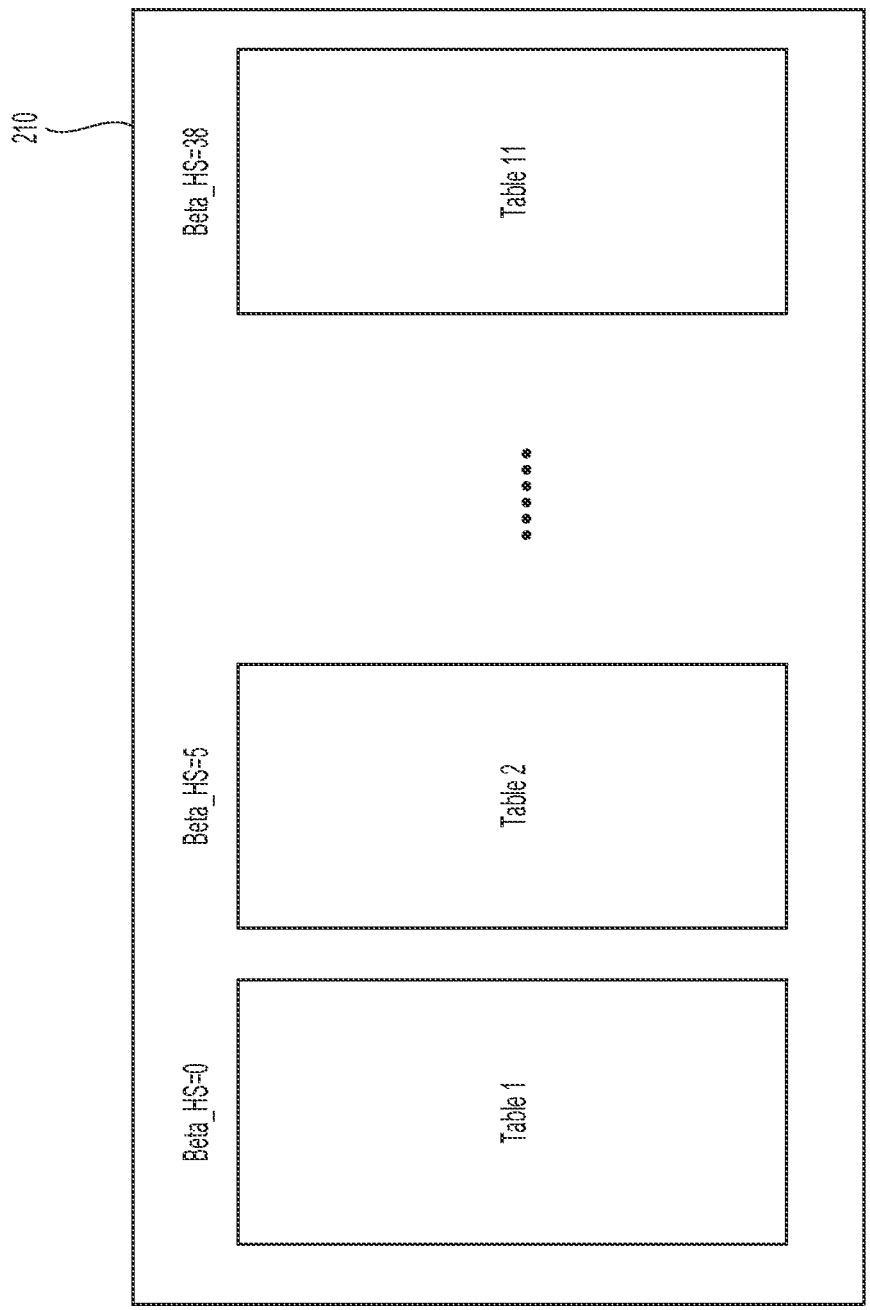
FIG. 6 illustrates exemplary data structures that can be implemented in a set of waveform tables, according to various implementations.
Figure 7:
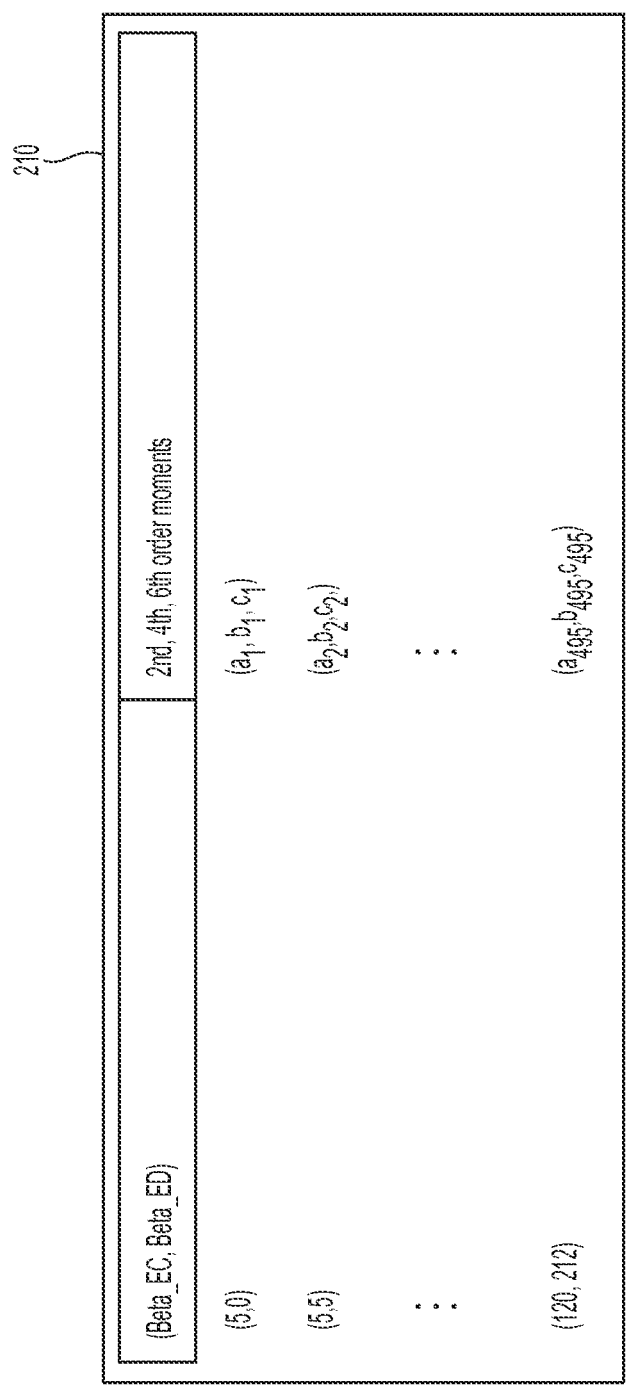
FIG. 7 illustrates further exemplary data structures that can be indexed in a set of waveform tables, according to various implementations.

FIGS. 6 and 7 illustrate various configurations, data structures, and/or values that can be encoded and/or stored in the set of waveform tables 210, according to aspects of the present teachings. According to aspects, some or all of the variables or parameters stored in the set of channel configuration information 214 can be assigned to a unique or separate table, with one table for each parameter, including various Beta values, as shown. Similarly, each table in the set of waveform tables 210 can be structured to store the corresponding 2nd, 4th, and 6th moments of each complex waveform in the set of dual-carrier waveforms 202. Although specific data types and arrangements are shown, it will be appreciated that other orders, structures, variables, data, and/or relationships between data in the set of waveform tables 210, and other associated information, can be used.

In terms of computations from the set of waveform tables 210, set of channel configuration information 214, and/or other data, the following calculations, analyses, and/or other processing can be applied. First, it may be noted that in dual-carrier high-speed uplink packet access (DC-HSUPA), each carrier in the set of dual-carrier waveforms 202 can be a conventional EUL (enhanced uplink) waveform without DPDCH (also without HS-DPCCH on the second carrier). Each carrier in the complex pair can have 1, 2, or 4 EDPDCH channels on it, and the number of E-DPDCH channels on each carrier is individually controlled by the respective selected ETFCI. Following the convention, a parameter $\mu$ can characterize the number of E-DPDCH channels on each carrier: In this regard, $\mu=1$ means 1 E-DPDCH channel, $\mu=2$ means 2 E-DPDCH channels of Orthogonal Variable Spreading Factor (OVSF) 4, $\mu=4$ means 2 E-DPDCH channels of OVSF2, $\mu=6$ means 2 E-DPDCH channel OVSF2+2 EDP-DCH channels of OVSF4. This implies there are 16 possible $(\mu_1, \mu_2)$ configurations, characterizing the E-DPDCH channel configurations on each carrier.

In terms of generating a set of moments of all possible waveforms on the primary carrier $(Z_1)$, the following processing can take place.

For each $\mu$ (taking 1, 2, 4 and 6):

First, set betaC=15. The remaining beta values are developed as:

betaHS=[0 5 6 8 9 12 15 19 24 30 38];

betaEC=[5 6 8 9 12 15 19 24 30 38 48 60 76 95 120];

betaED=[0 5 6 7 8 9 11 12 13 15 17 19 21 24 27 30 34 38 . . . 42 47 53 60 67 75 84 95 106 119 134 150 168 189 212].

For each betaHS, one table is generated: in the table, each entry is indexed by a pair of (betaEC, betaED), while each entry consists of three components, the 2nd, 4th and 6th moments for the waveform determined by the given $\mu$, betaHS, betaEC, and betaED. Hence, in total there are 4*11 tables, and each table consists of 15*33 entries with each entry carrying 3 real values for the 2nd, 4th, and 6th order moments of the corresponding EUL waveform. For each betaHS, one table is generated: in the table, each entry is indexed by a pair of (betaEC, betaED), while each entry consists of three components, the 2nd, 4th and 6th moments for the waveform determined by the given $\mu$, betaHS, betaEC, and betaED. Hence, in total there are 4*11 tables, and each table consists of 15*33 entries with each entry carrying 3 real values for the 2nd, 4th, and 6th order moments of the corresponding EUL waveform.

In terms of the format of each constituent table, assuming 4 bytes are used to store one moment value in floating format, memory of size 4*11*495*3*4=261360 bytes will be required, or about 260 Kbytes. It may be noted that this is a significant reduction compared with the at least 10 Mbytes that would be required by adopting a purely storage-based method for dual-carrier systems.

Again, before the MPR is computed, in this example, he modulator 166 or other processor(s) identifies all the configuration parameters of the dual-carrier high-speed uplink packet access (DC-HSUPA) waveform contained in the set of channel configuration information 214, including: $\mu\_1$, betaC_1, betaHS, betaEC_1, betaED_1, u_2, betaC_2, betaEC_2, betaED_2. Note that the moment tables can be computed assuming betaC=15. Hence in aspects instead of having both betaC_1 and betaC_2 values, only a ratio between betaC_2 and betaC_1: or RatioDPCCH is needed.

The initial step is to retrieve the moments for the EUL waveform on each carrier: 1) for primary carrier $(Z_1)$, retrieve the entry from the table indexed with $\mu=\mu\_1$ and given Beta_HS; 2) for second carrier $(Z_2)$, retrieve the entry from the table indexed with $\mu=\mu\_2$ and betaHS=0. Denote the table entries by E1 and E2, and denote the 2nd, $4^{th}$, and 6th moments in each entry as: a(E1), b(E1), c(E1), a(E2), b(E2), and c(E2). Now, the $V_{cub}$ of the given dual-carrier high-speed uplink packet access (DC-HSUPA) waveform can be computed with the six moment values and the $Ratio_{DPCCH}$ as:

$$V_{cub}(Z) = \sqrt{\frac{E\{|Z|^6\}}{E^3\{|Z|^2\}}} \approx \sqrt{\frac{E\{|Z_1|^6\} + E\{|Z_2|^6\} + 9E\{|Z_1|^4\}E\{|Z_2|^2\} + 9E\{|Z_1|^2\}E\{|Z_2|^4\}}{(E\{|Z_1|^2\} + E\{|Z_2|^2\})^3}}$$

Equation 7

$$V_{cub}(Z) = \sqrt{\frac{E\{|Z|^6\}}{E^3\{|Z|^2\}}} \approx$$

$$\sqrt{\frac{c(E_1) + \text{Ratio}_{DPCCH}^6 c(E_2) + 9b(E_1)\text{Ratio}_{DPCCH}^2 a(E_2) + 9a(E_1)\text{Ratio}_{DPCCH}^4 b(E_2)}{(a(E_1) + \text{Ratio}_{DPCCH}^2 a(E_2))^3}}$$

Equation 8

With $V_{cub}$ calculated, processing proceeds, in this example, to compute the cubic metric (CM) value and the corresponding MPR value according to specifications noted above:

CM=CEIL{[20*log 10((v_norm^3)rms)−20*log 10((v_norm_ref^3)rms)]/k,0.22}

MPR=MAX(CM−0.72,0)(dB).

Figure 8:
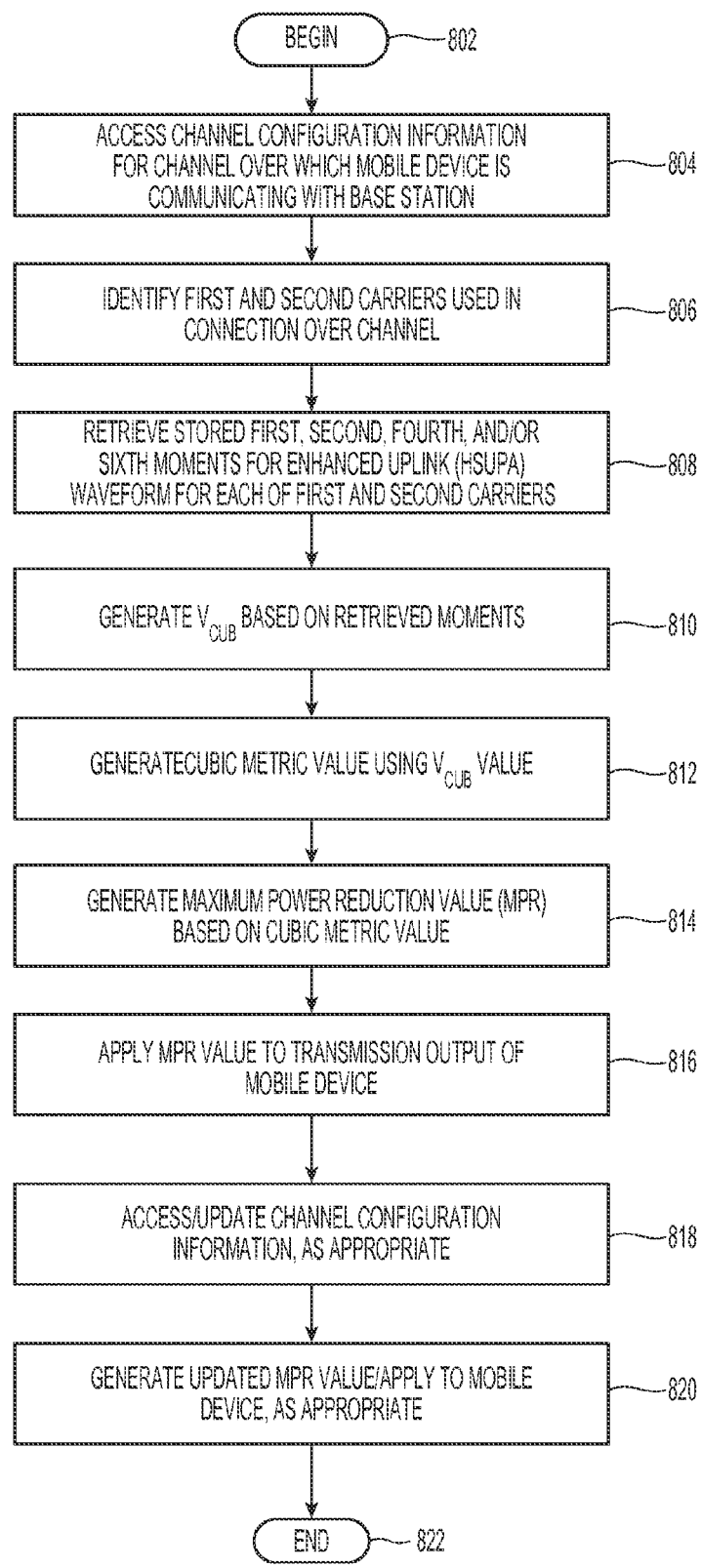
FIG. 8 illustrates a flowchart of overall processing that can be used in memory-efficient storage and extraction of maximum power reduction (MPR) values in two-carrier wireless data systems, according to various implementations.

FIG. 8 illustrates a flowchart of overall waveform, MPR, and related processing, according to aspects of the present teachings. In 802, processing can begin. In 804, the modulator 166 can access and/or obtain the set of channel configuration information 214 for the channel over which the mobile device 105 is communicating with the base station 172 and/or other access point or entity. In 806, the modulator 166 can identify the first and second carriers ($Z_1$ and $Z_2$) used in the connection over the existing channel. In 808, the modulator 166 identifies the 1st, 2nd, 4th, and/or 6th moments for the two complex carriers of the enhanced uplink, or dual-carrier high-speed uplink packet access (DC-HSUPA) signal. As noted above, these moments may be identified by the modulator 166 retrieving of accessing values stored in a look-up table using the obtained channel configuration data and the identified first and second carriers. In 810, the modulator 166 calculates a value for $V_{cub}$ based on the retrieved moments and/or other data using methods, for example, such as those discussed above. In 812, the modulator 166 can generate a cubic metric, for instance according to Equations 1-8 above, using the calculated value for $V_{cub}$.

In 814, the modulator 166 generates a maximum power reduction (MPR) value based on the cubic metric value, and/or other information. In 816, the modulator 166 can apply the MPR value to the transmission output of the mobile device 105 and/or other device. In 818, the modulator 166 can access and/or update the set of channel configuration information 214, as appropriate. In 820, the modulator 166 can generate an updated MPR value and apply that revised value to the transmission output of the mobile device 105 and/or other device, as appropriate. In 822, processing can repeat, return to a prior processing point, jump to a further processing point, or end. Although FIG. 8 was discussed with reference to modulator 166 performing many of the discussed steps for ease of explanation, it should be understood that in other embodiments one or more or all of these steps may be performed by other processors, such as processor 158.

In accordance with various aspects of the disclosure, an element, or any portion of an element, or any combination of elements may be implemented with a "processing system" that includes one or more processors. For example, various components illustrated in FIGS. 2 and 8 may be implemented, for example, with a processing system. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Embodiments of the present invention have been described with reference to several aspects of the present invention. It would be appreciated that embodiments described in the context of one aspect may be used with other aspects without departing from the scope of the present invention Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart there from.

The foregoing description is illustrative, and variations in configuration and implementation may occur to persons skilled in the art. For example, while implementations have been described in which a mobile device 105 communicates with a cellular base station 172, in implementations, the mobile device 105 can communicate with other platforms or entities, such as for instance a wireless router (e.g., a WiFi™ router) and/or other device. Similarly, while implementations have been described in which power reduction processing is performed on HSUPA Category 9 platforms, in implementations, platforms and techniques according to the present teachings can be implemented in other types or classes of wireless transmission systems using two carriers. In implementations, platforms and techniques according to the present teachings can be implemented in systems using more than two carriers, by identifying corresponding moments for those multiple carriers to reduce the storage of MPR values. Other resources described as singular or integrated can in implementations be plural or distributed, and resources described as multiple or distributed can in implementations be combined. The scope of the present teachings is accordingly intended to be limited only by the following claims.

What is claimed is:

1. A method of managing transmission power in a mobile device, comprising:
    establishing a high speed uplink packet access (HSUPA) channel between the mobile device and a network access point, the high speed uplink packet access (HSUPA) channel comprising a wireless connection using at least two carriers;
    identifying a set of moments of the waveform of each of the at least two carriers, the set of the moments comprising at least a plurality of even moments of the waveforms for each carrier; and
    determining a maximum power reduction (MPR) value for the high speed uplink packet access (HSUPA) connection based on the set of the moments of the at least two carriers.

2. The method of claim 1, wherein the plurality of even moments comprises at least the second, fourth, and sixth moments of the waveforms for each of the at least two carriers.

3. The method of claim 2, wherein the maximum power (MPR) value is based on:

$$V_{cub}(Z) = \sqrt{\frac{E\{|Z|^6\}}{E^3\{|Z|^2\}}} \approx$$

$$\sqrt{\frac{E\{|Z_1|^6\} + E\{|Z_2|^6\} + 9E\{|Z_1|^4\}E\{|Z_2|^2\} + 9E\{|Z_1|^2\}E\{|Z_2|^4\}}{(E\{|Z_1|^2\} + E\{|Z_2|^2\})^3}}.$$

4. The method of claim 1, wherein the maximum power reduction (MPR) value is based on an arbitrary difference in power between the at least two carriers.

5. The method of claim 1, wherein the high speed packet access (HSUPA) connection comprises a connection conforming to 3GPP Category 9 signaling standards.

6. The method of claim 1, wherein the waveforms for the second of the at least two carriers comprises a subset of the waveforms for the first of the at least two carriers.

7. The method of claim 1, wherein the set of moments is stored in the mobile device.

8. The method of claim 7, wherein the determining a maximum power reduction (MPR) value comprises:
    retrieving the set of moments in the mobile device, and
    determining the maximum power reduction value (MPR) in the mobile device based on the retrieved set of moments.

9. The method of claim 8, wherein the retrieving the set of moments in the mobile device comprises accessing the set of moments in the mobile device based on a set of channel configuration information characterizing the high-speed upload packet access (HSUPA) channel between the mobile device and the access point.

10. The method of claim 9, wherein the set of moments is:
    stored in a set of waveform tables, and
    indexed in the set of waveform tables based on parameters contained in the set of channel configuration information.

11. A mobile system, comprising:
    a transmitter configured to transmit information over a wireless interface to an access point, the wireless interface comprising a high speed uplink packet access (HSUPA) channel between the mobile system and a network access point, the high speed uplink packet access (HSUPA) channel comprising at least two carriers; and
    a processor configured to:
        establish the high speed uplink packet access (HSUPA) channel between the mobile system and a network access point via the wireless interface,
        identify a set of moments of the waveform of each of the at least two carriers, the set of the moments comprising at least a plurality of even moments of the waveforms for each carrier, and
        determine a maximum power reduction (MPR) value for the high speed uplink packet access (HSUPA) connection based on the set of the moments of the at least two carriers.

12. The system of claim 11, wherein the plurality of even moments comprises at least the second, fourth, and sixth moments of the waveforms for each of the at least two carriers.

13. The system of claim 12, wherein the maximum power (MPR) value is based on:

$$V_{cub}(Z) = \sqrt{\frac{E\{|Z|^6\}}{E^3\{|Z|^2\}}} \approx$$

$$\sqrt{\frac{E\{|Z_1|^6\} + E\{|Z_2|^6\} + 9E\{|Z_1|^4\}E\{|Z_2|^2\} + 9E\{|Z_1|^2\}E\{|Z_2|^4\}}{(E\{|Z_1|^2\} + E\{|Z_2|^2\})^3}}.$$

14. The system of claim 11, wherein the maximum power reduction (MPR) value is based on an arbitrary difference in power between the at least two carriers.

15. The system of claim 11, wherein the high speed packet access (HSUPA) connection comprises a connection conforming to 3GPP Category 9 signaling standards.

16. The system of claim 11, wherein the waveforms for the second of the at least two carriers comprises a subset of the waveforms for the first of the at least two carriers.

17. The system of claim 11, wherein the set of moments is stored in the mobile system.

18. The system of claim 17, wherein the processor is configured to determine the maximum power reduction (MPR) value by a method comprising:
retrieving the set of moments in the mobile system, and
determining the maximum power reduction value (MPR) in the mobile system based on the retrieved set of moments.

19. The system of claim 18, wherein the retrieving the set of moments in the mobile system comprises accessing the set of moments in the mobile system based on a set of channel configuration information characterizing the high-speed upload packet access (HSUPA) channel between the mobile system and the access point.

20. The system of claim 19, further comprising:
a storage configured to store the set of moments in a set of waveform tables such that set of moments are indexed in the set of waveform tables based on parameters contained in the set of channel configuration information.

21. A mobile system, comprising:
means for establishing a high speed uplink packet access (HSUPA) channel between the mobile system and a network access point means, the HSUPA channel comprising at least two carriers;
means for identifying a set of moments of the waveform of each of the at least two carriers, the set of the moments comprising at least a plurality of even moments of the waveforms for each carrier; and
means for determining a maximum power reduction (MPR) value for the high speed uplink packet access (HSUPA) connection based on the set of the moments of the at least two carriers.

22. A non-transitory computer-readable medium comprising:
at least one instruction for causing a computer to establish a high speed uplink packet access (HSUPA) channel between the mobile device and a network access point, the high speed uplink packet access (HSUPA) channel comprising a wireless connection using at least two carriers;
at least one instruction for causing a computer to identify a set of moments of the waveform of each of the at least two carriers, the set of the moments comprising at least a plurality of even moments of the waveforms for each carrier; and
at least one instruction for causing a computer to determine a maximum power reduction (MPR) value for the high speed uplink packet access (HSUPA) connection based on the set of the moments of the at least two carriers.

\* \* \* \* \*